United States Patent
Smith

(10) Patent No.: US 7,527,453 B2
(45) Date of Patent: May 5, 2009

(54) RIBBED MODULE FOR WAVE ENERGY DISPERSION

(75) Inventor: Dennis G. Smith, Summit, NJ (US)

(73) Assignee: Wave Dispersion Technologies, Inc., Summit, NJ (US)

( * ) Notice: Subject to any disclaimer, the term of this patent is extended or adjusted under 35 U.S.C. 154(b) by 0 days.

(21) Appl. No.: 10/868,117

(22) Filed: Jun. 15, 2004

(65) Prior Publication Data

US 2005/0019098 A1    Jan. 27, 2005

Related U.S. Application Data

(63) Continuation of application No. 10/002,601, filed on Nov. 1, 2001, now abandoned, which is a continuation-in-part of application No. 29/132,444, filed on Nov. 9, 2000, now Pat. No. Des. 457,969.

(60) Provisional application No. 60/259,368, filed on Dec. 29, 2000.

(51) Int. Cl.
*E02B 3/06*    (2006.01)

(52) U.S. Cl. .............................. 405/26; 405/28; 405/33

(58) Field of Classification Search .................... 405/21, 405/23, 25, 26, 27, 29, 30, 31, 33, 35, 110, 405/111, 114, 116
See application file for complete search history.

(56) References Cited

U.S. PATENT DOCUMENTS

| | | | |
|---|---|---|---|
| 527,513 | A | 10/1894 | See et al. |
| 1,593,863 | A | 7/1926 | Brasher |
| 3,373,821 | A | 3/1968 | Sare |
| 3,842,606 | A | 10/1974 | Stiles et al. |
| 3,846,990 | A | 11/1974 | Bowley |
| 3,894,397 | A | 7/1975 | Fair |
| 3,938,338 | A | 2/1976 | Cullen |
| 4,118,937 | A | 10/1978 | Mansen |
| 4,178,517 | A | 12/1979 | Salomon et al. |
| 4,264,233 | A | 4/1981 | McCambridge |
| 4,341,489 | A | 7/1982 | Karnes |
| 4,407,607 | A | 10/1983 | McCambridge |
| 4,431,337 | A | 2/1984 | Iwasa |
| 4,669,913 | A | 6/1987 | Temple |
| 4,691,661 | A | 9/1987 | Deiana |
| 4,729,691 | A | 3/1988 | Sample |
| 4,729,692 | A | 3/1988 | Tucker |
| 4,748,338 | A | 5/1988 | Boyce |
| 4,776,724 | A | 10/1988 | Isozaki |
| 4,776,725 | A | 10/1988 | Brade |

(Continued)

FOREIGN PATENT DOCUMENTS

GB    805789    11/1955

*Primary Examiner*—M. Safavi

(57) ABSTRACT

A ribbed module is provided having a ribbed exterior surface defining a plurality of grooves and channels along the surface for receiving water and directing the water in a direction different from that in which it is received to reduce wave energy. The module is formed as a single integral unit, or as a pair of halves having complementary mating locking elements which when engaged join the halves to form the ribbed module. A buoyancy system is also included to adjust the buoyancy of the module for positioning of same at a select position in the water. A plurality of modules are connected to provide breakwaters which reduce the effects of wave action on the shore.

2 Claims, 13 Drawing Sheets

U.S. PATENT DOCUMENTS

| | | |
|---|---|---|
| 4,844,654 A | 7/1989 | Widerman |
| 4,856,933 A | 8/1989 | Tubbs, Jr. |
| 4,856,934 A | 8/1989 | Nelson |
| 4,856,935 A | 8/1989 | Haras |
| 4,900,188 A | 2/1990 | Haselton et al. |
| 5,038,542 A * | 8/1991 | Kline .......................... 52/306 |
| 5,104,258 A | 4/1992 | Ianell |
| 5,122,015 A | 6/1992 | Shen |
| 5,238,325 A | 8/1993 | Krenzler |
| 5,238,326 A | 8/1993 | Creter |
| 5,246,307 A | 9/1993 | Rauch |
| 5,250,696 A | 10/1993 | Dunlap et al. |
| 5,556,229 A | 9/1996 | Bishop et al. |
| 5,564,369 A | 10/1996 | Barber et al. |
| 5,588,271 A * | 12/1996 | Pitchford .................... 52/306 |
| 5,879,105 A | 3/1999 | Bishop et al. |

* cited by examiner

RIBBED MODULE FOR WAVE ENERGY DISPERSION

CROSS REFERENCE TO RELATED APPLICATIONS

This application is a continuation of Ser. No. 10/002,601 filed Nov. 1, 2001 now abandoned which is a CIP of Ser. No. 29/132,444 filed Nov. 9, 2000 now U.S. Pat. No. Design,457, 969 and claims benefit of 60/259,368 filed Dec. 29, 2000.

BACKGROUND OF THE INVENTION

1. Field of the Invention

The present invention relates to apparatus and methods used to intercept waves and disperse the energy therein to thereby dissipate, if not eliminate, the wave action.

2. Description of the Related Art

Structures are known to be positioned in marine environments to function as breakwaters to reduce the effects of wave action from the shore. Such devices are disclosed in the patents discussed below.

The construction and arrangement of breakwaters to reduce erosion of shorelines has changed to include other than just concrete fixtures. For example, such devices and systems are disclosed in:

| U.S. Pat. No. | Inventor(s) |
| --- | --- |
| 527,513 | See et al. |
| 1,593,863 | Brasher |
| 3,373,821 | Sare |
| 3,842,606 | Stiles |
| 3,846,990 | Bowley |
| 3,894,397 | Fair |
| 3,938,338 | Cullen |
| 4,118,937 | Mansen |
| 4,178,517 | Salomon et al. |
| 4,264,233 | McCambridge |
| 4,341,489 | Karnas |
| 4,407,607 | McCambridge |
| 4,431,337 | Iwasa |
| 4,669,913 | Temple |
| 4,691,661 | Deiana |
| 4,729,691 | Sample |
| 4,729,692 | Techer |
| 4,748,338 | Boyce |
| 4,776,724 | Iswald |
| 4,776,725 | Brode |
| 4,844,654 | Widerman |
| 4,856,933 | Tubbs, Jr. |
| 4,856,934 | Nelson |
| 4,856,935 | Haras |
| 4,900,188 | Haselton et al. |
| 5,104,258 | Ianell |
| 5,122,015 | Shen |
| 5,238,325 | Krenzler |
| 5,238,326 | Creter |
| 5,246,307 | Rauch |
| 5,250,696 | Beardsley |
| 5,556,229 | Bishop et al. |
| 5,564,369 | Barber et al. |
| Foreign Patent | |
| 805,789 (British) | Laurei |

British Patent No. 805,789 also discloses a breakwater device which employs gas bubbles in the path of the wave motion to reduce sea waves and swell.

U.S. Pat. No. 5,879,105 to Bishop et al discloses a wave energy dispersion model with smooth flat faceted surface to dissipate wave energy and is incorporated herein by reference. The present invention represents an improvement over this prior device.

Traditional breakwaters, sea walls and jetties have failed to substantially curtail the destructive force of moving water primarily because of their construction, and tendencies to reflect or direct wave energy in destructive ways or concentrate the energy in local hot spots. Erosion and the scouring effects of the misdirected energy lead to the loss of the beach and undermining of the structures which were meant to protect the shoreline.

In addition, other fixed structures such as groins lead to the loss of natural flows and downdrift beaches by interrupting the littoral flows and generally create a surplus condition on the updraft side and a starvation condition on the downdraft beaches.

Other erosion control systems which are positioned offshore do not provide the arrangement of surfaces which deflect and redirect breaking waves so that eddies and vortexes produced interfere with and cancel each other, as well as the oncoming portions of the next successive wave.

Many of these known devices and systems are rigidly mounted to the shore or shelf portion underneath the surf in a manner which severely restricts, if not eliminates, removal of the system to another location where the barriers are needed more urgently. These same systems also usually require an extensive and expensive environmental impact study to justify use of the systems in marine environments which are essentially classified as "sensitive".

OBJECTS AND SUMMARY OF THE INVENTION

It is a principal object of the present invention to provide a wave energy dispersion module and system constructed and arranged to moderate, attenuate and dissipate energy transmitted through flowing water and gravity waves.

It is an object of the present invention to provide a module constructed to dissipate energy from flowing water regardless of the amount of water or the size of any waves, such that erosion of a shoreline is substantially reduced if not eliminated.

It is another object of the present invention to provide a plurality of the modules arranged as a unit to be disposed offshore to extract wave energy and substantially reduce if not eliminate coastal erosion.

It is another object of the present invention to provide a plurality of units consisting of the modules, the units arranged in a staggered formation off shore to extract energy from waves and substantially reduce if not eliminate coastal erosion.

It is another object of the present invention to provide a wave energy extraction system which is constructed to be anchored offshore and removably mountable in its configuration such that removal to a remote location is quick, easy, and less expensive to implement than known systems.

It is another object of the present invention to provide modules constructed and arranged with respect to each other in the units such that water passages of different dimensions are provided to effect movement of the waves through the unit.

It is another object of the present invention to provide modules with ribbed surfaces, channels and grooves such that waves impinging on the modules are directed to form eddies and vortexes which impact and interfere with each other and effectively cancel each other.

It is another object of the present invention to provide a plurality of wave energy extraction units mounted to the sea floor by flexible support assemblies which permit the units to move and extract energy from the waves.

It is another object of the present invention to provide a wave energy extraction system which substantially reduces the effect of wave energy on the surf zone and the loss of sand therealong.

It is another object of the present invention to provide a wave energy extraction system constructed and arranged to be particularly effective in depths of water where most erosion occurs.

It is another object of the present invention to provide a wave energy extraction system having a plurality of units which can be filled with a substance to control the buoyancy, or tune the system with respect to the size and amplitude of the waves impacting the system.

It is another object of the present invention to provide a wave energy extraction system which has a portion thereof floating just above the surface and upon which objects or marine mammals can be supported.

It is another object of the present invention to provide a wave energy extraction system which does not impact upon the marine environment and which is aesthetically pleasing.

It is another object of the present invention to provide a wave energy extraction system constructed and arranged as an inverted pyramid to dissipate wave energy along a plurality of deflecting channels, surfaces and facets, such that incoming waves are directed to interfere with each other.

It is another object of the present invention to provide a wave energy dispersion system which because of its inverted pyramid shape substantially reduces the wave height thereby reducing the erosionary nature of the wave energy moving toward the shoreline.

It is another object of the present invention to provide a wave energy extraction system and anchoring system to coact therewith such that the frequency of the system can be tuned depending upon the particular activity of the waves at that location.

It is another object of the present invention to provide a wave energy extraction system which is capable of converting the wave energy to heat, mechanical motion and kinetic energy.

It is another object of the present invention to provide a wave energy extraction system resiliently mounted by an anchoring system, and which is adapted to expand to absorb incoming flowing water for fracturing the waves.

It is another object of the present invention to provide a wave energy extraction system consisting of a multiplicity of individual modules flexibly mounted together which coact with one another to force the incoming waves to form eddies and vortexes which interfere with each other, thereby extracting energy from the wave.

It is another object of the present invention to provide a wave energy extraction system which is relatively inexpensive to construct and maintain and substantially increases the percentage of wave energy extracted.

It is another object of the present invention to provide a wave energy extraction system which is easy to assemble and disassemble, and is removably mountable to its anchoring system such that the system requiring repair can easily be removed and another system substituted therefor in a relatively short amount of time.

It is another object of the present invention to provide a wave energy extraction system consisting of a plurality of layers of modules, which layers are constructed and arranged in a staggered arrangement to fracture the incoming wave flow and provide eddies and vortexes directed into passages of the system to interfere with successive wave flow.

It is another object of the present invention to provide a wave energy extraction system which employs a concertina effect to interfere with the flowing water.

It is another object of the present invention to provide a wave energy extraction system adapted to have its buoyancy and mass adjusted to reduce the amplitude of waves moving toward the shoreline.

It is another object of the present invention to provide a wave energy extraction system which does not succumb to the harsh marine environment of breakers, salt water, intense sunlight and weather conditions, undertow and other forms of erosion.

It is another object of the present invention to provide a wave energy extraction system including a module constructed as a one-piece module or from a plurality of portions, preferably two, joined together with a connecting assembly.

It is another object of the present invention to provide a wave energy extraction system having two portions constructed such that free communication occurs between the two portions.

It is another object of the present invention to provide a wave energy extraction system wherein each one of the portions for the module are self-contained and do not permit free communication between the respective portions.

It is another object of the present invention to provide a locking assembly for the connection of modules such that when portions of a module are connected, they are locked into a select position.

It is another object of the present invention to provide a wave energy extraction system constructed of a pair of portions joined by a connection assembly which permits releasable engagement of the portions.

The objects of the present invention are accomplished by providing a module constructed with a plurality of ribbed surfaces and channels arranged to fracture a wave impinging thereon and direct the wave into eddies and vortices which interfere with each other to substantially reduce the wave energy. Pairs of mating modules are joined together with a unique connection assembly. A plurality of such modules are connected to form breakwaters which reduce the effects of wave action on the shore.

BRIEF DESCRIPTION OF THE DRAWINGS

For a more complete understanding of the present invention, reference may be had to the detailed description of the preferred embodiments taken in connection with the accompanying drawings, of which.

DETAILED DESCRIPTION OF THE PREFERRED EMBODIMENTS

Figure 1:
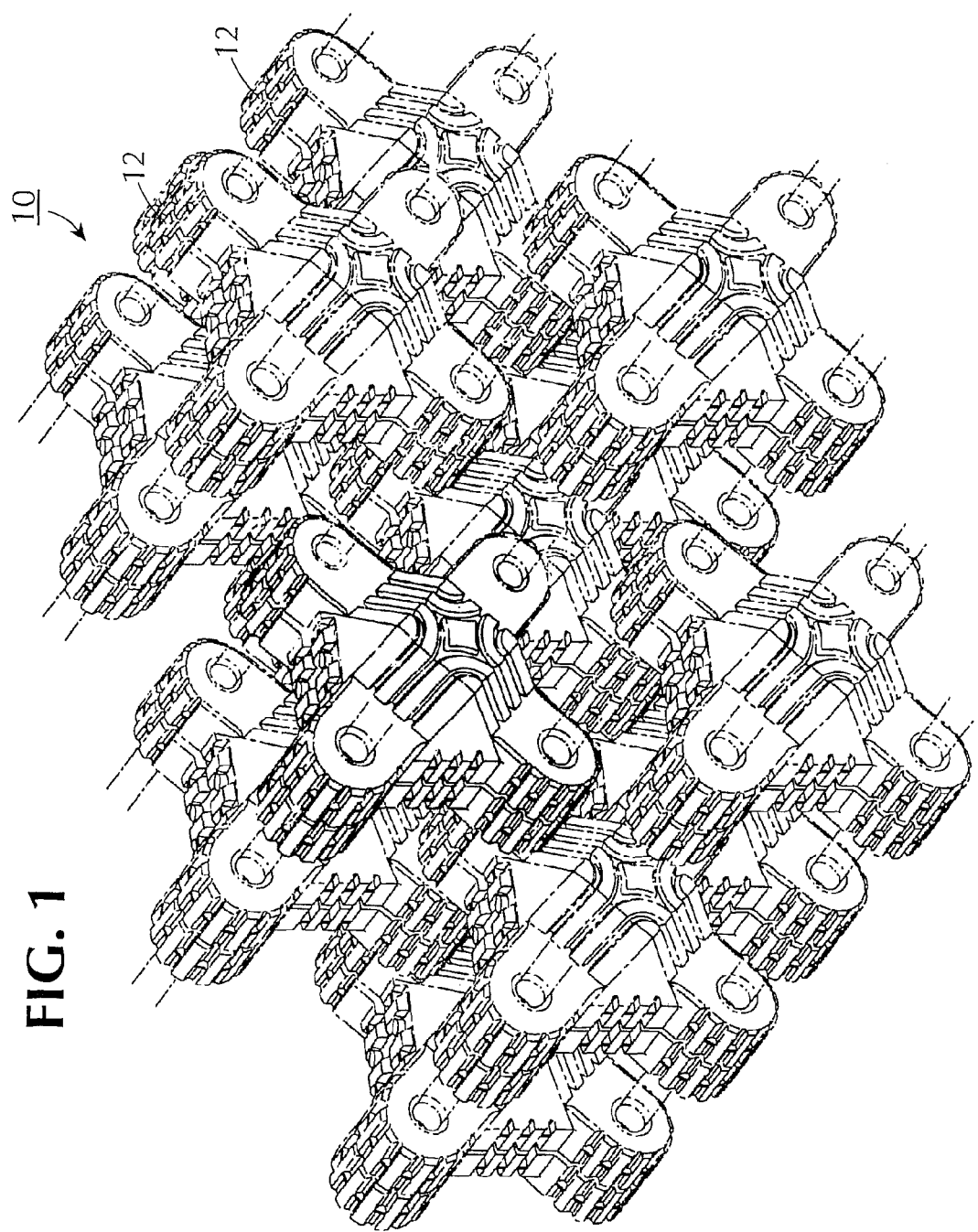
FIG. 1 is a perspective view of the a portion of a system according to the present invention, including a plurality of the assembled ribbed modules wherein the broken lines are for illustrative purposes only.

Referring to FIG. 1, a ribbed energy extraction system 10 (hereinafter the "system") of the present invention is constructed and arranged for use offshore in the sea and oceans, as well as for use in the waters surrounding marinas, harbors and the like. Although the system has been characterized for use in particular with ocean waves, it is constructed and arranged to extract energy from flowing water, regardless of the salinity of water in which the system is positioned. In addition, as has been presented in the objects above, one of the advantages of the system is that it can be tuned to effectively and efficiently extract energy from flowing water, regardless of whether that water is flowing in the ocean, a delta or a river.

In FIG. 1, a portion of the system is shown including a plurality of pairs of ribbed modules 12 to be secured in a layered arrangement, an anchoring assembly, a restraining assembly, or other shapes to be disposed in the water to extract energy therefrom.

In FIGS. 2-5, a ribbed module 12 is shown from which the system is constructed. The module consists of a buoyant body having four walls; designated front wall 14, back wall 16, top wall 18 and bottom wall 20. The perimeter of the walls are preferably of a rectangular shape.

Figure 4:
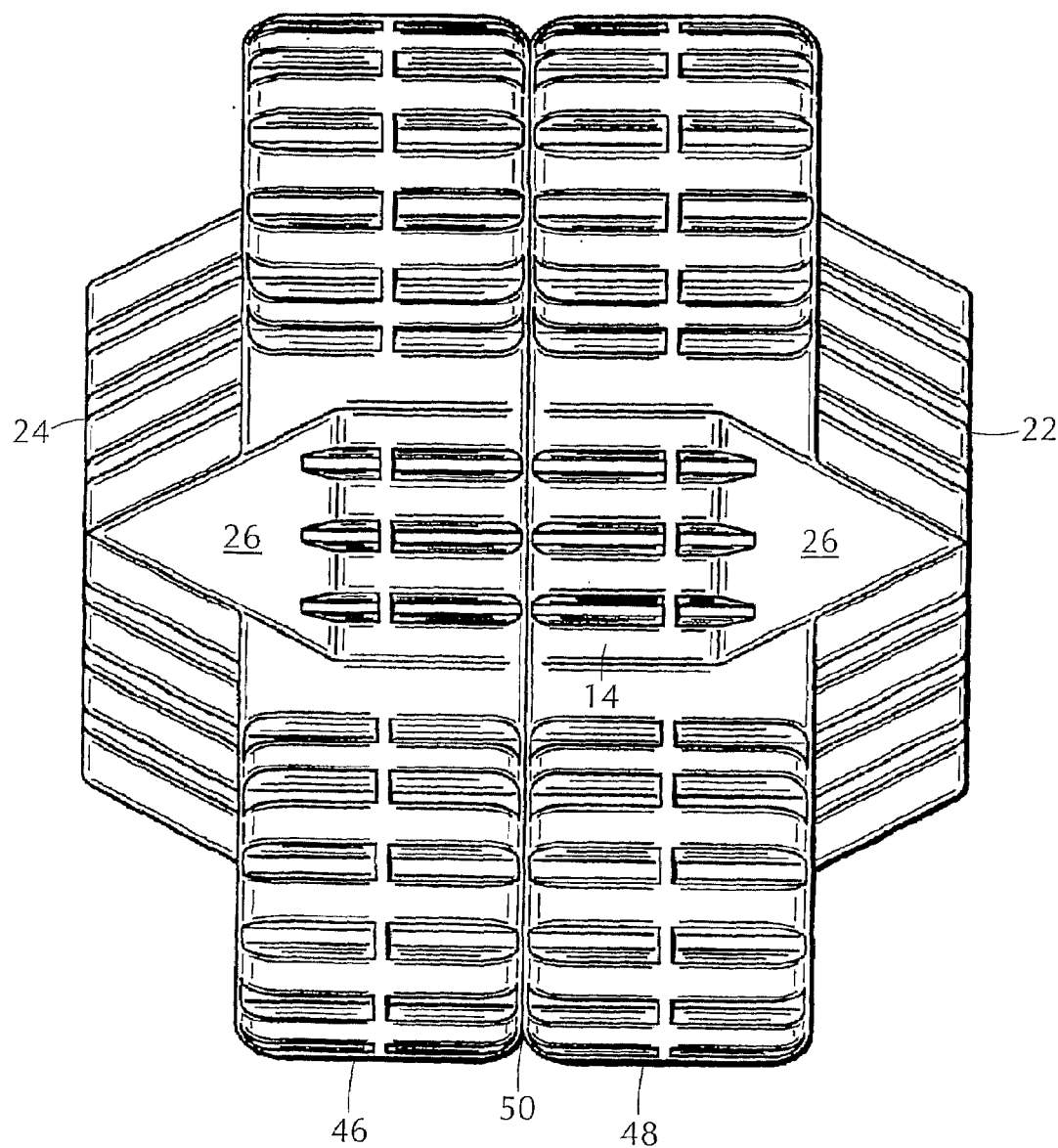
FIG. 4 is a left side elevational view of the pair of joined ribbed modules, a right side elevational view being a mirror image thereof.
Figure 5:
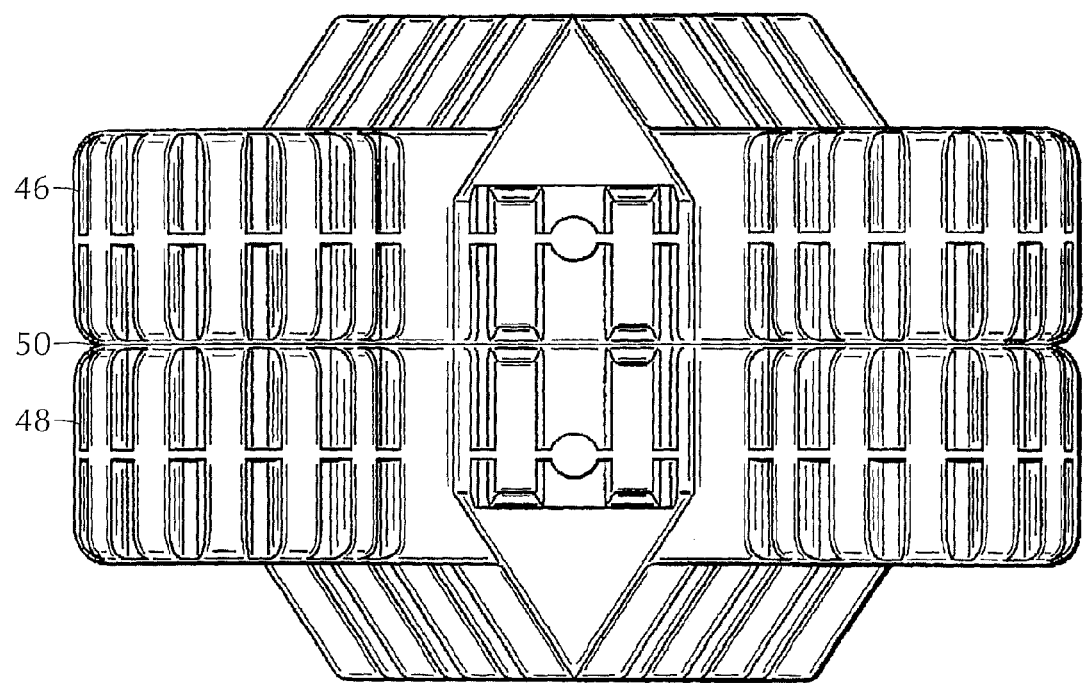
FIG. 5 is a top plan view of the pair of ribbed modules, a bottom plan view being a mirror image thereof.

The body also is provided with a first sidewall 22 and a second sidewall 24 in spaced relation. The perimeter of the sidewalls are preferably of a rectangular shape. As shown in FIG. 4, the side walls extend outwardly and form a thicker central dimension which provides more efficient nesting of adjacent modules.

Transition surfaces 26 connect each one of said front wall, back wall, top wall and bottom wall to each of said sidewalls in spaced relation. The transition surfaces are preferably of a triangular shape. The various wall thicknesses and module sizes can be varied to suit different bodies of water.

The front, back, top and the bottom walls, and the first and second sidewalls all have a plurality of ridges 28, grooves 30 and channels 32 providing ribbed surfaces which have increased friction drag and resistance to waves. Seams along which these surfaces intersect are preferably even and well defined, and provide for a generally 45° angle among the inclined surfaces.

The buoyant body of the module is provided with attaching means so that the plurality of buoyant bodies can be removably mounted and layered in a plurality of rows to arrive at an inverted pyramid configuration with the number of modules in the upper rows being greater and decreasing to the lower rows immersed in the water. In particular, each one of the attaching means, preferably four in number, is connected to at least one of each said walls. In operation, the attaching means resemble and function as a yoke 34.

Figure 2:
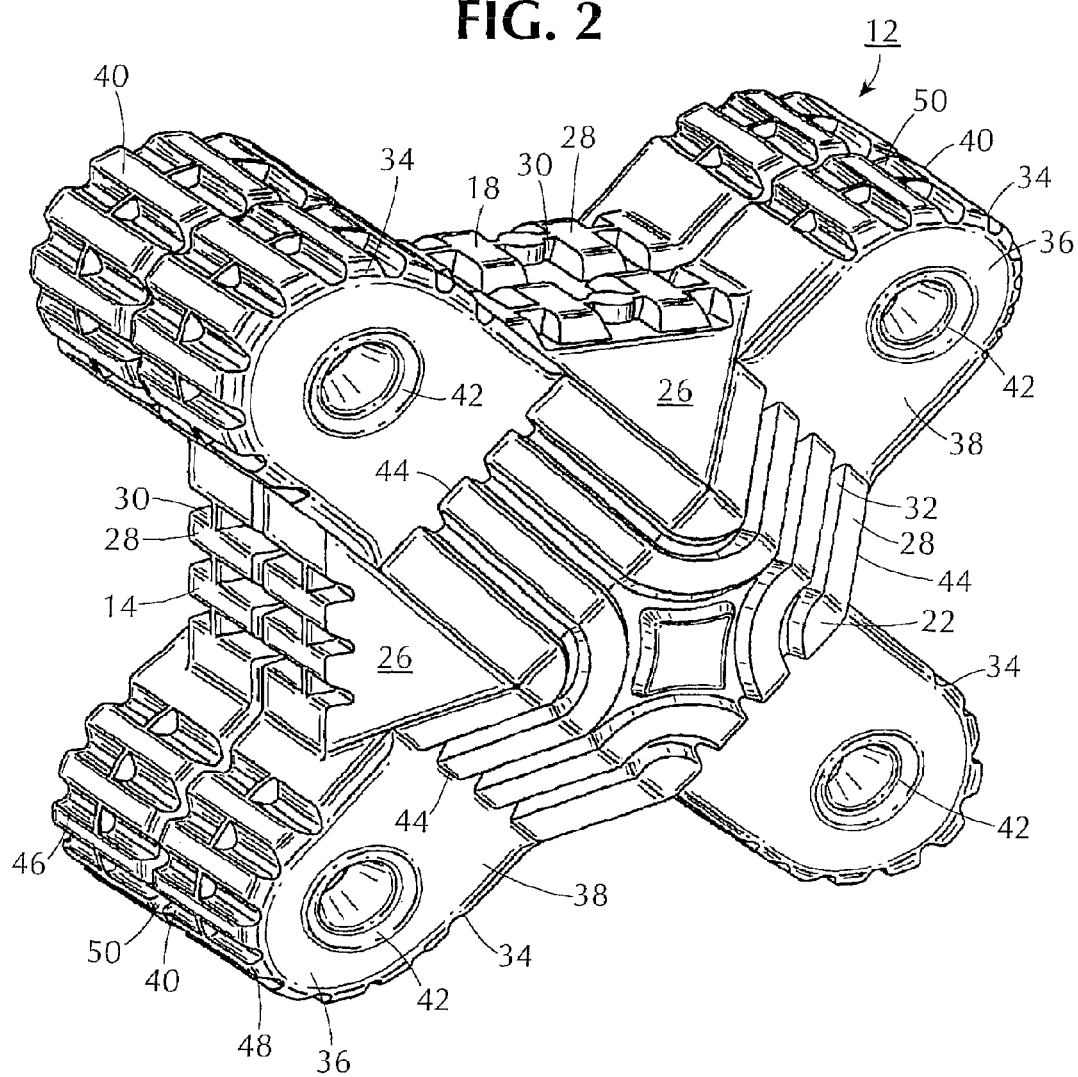
FIG. 2 is a perspective front view of a pair of ribbed modules joined together.
Figure 3:
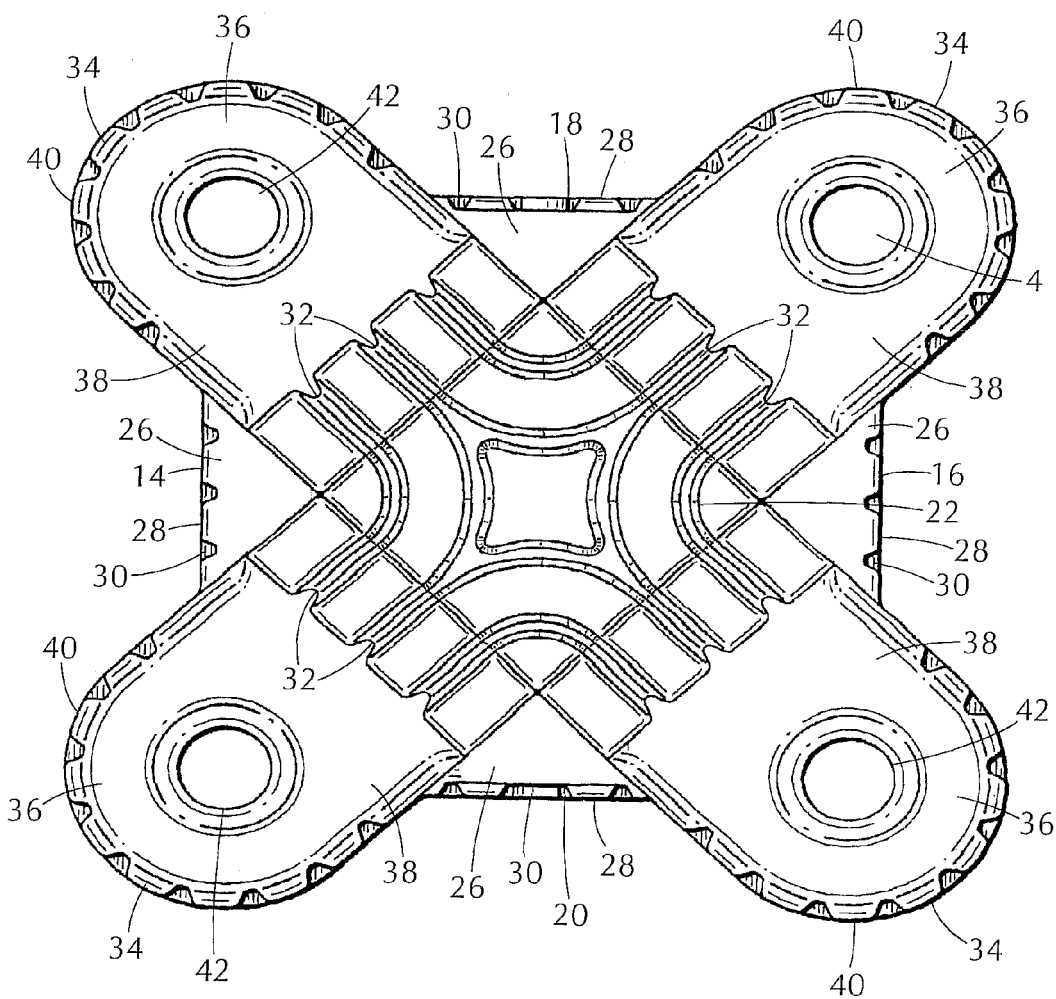
FIG. 3 is a front elevational view of the joined pairs of ribbed modules, a rear elevational view being a mirror image thereof.

Each one of the yokes is provided with a protruding end 36 and a transition end 38. The protruding end extends from the adjacent walls and is constructed with a length that is perpendicular to the first and second sidewalls in spaced relation. Preferably, the protruding end of the yoke is formed as a cylindrical section, as shown in FIGS. 2 and 3, although other shapes for the protruding end can be employed to effectively carry out the invention. A longitudinal axis of the protruding end is arranged substantially perpendicular to a plane of each one of the sidewalls in spaced relation. The outer surfaces 40 of the cylindrical protruding ends have ribbed protrusions and depressions similar to those of the front, back, top and bottom walls.

Opposed ends of the protruding end of the yoke terminate in spaced apart terminating surfaces which are substantially parallel to each other, and to the first and second sidewalls in spaced relation.

Each one of the buoyant bodies is provided with a passage means 42 which is constructed and arranged to extend through the protruding end and the spaced apart terminating surfaces of the yoke. Preferably, the distance between the spaced apart terminating surfaces of the protruding end is less than a distance measured between the first and second sidewalls in spaced relation. In addition, it is preferable that the spaced apart terminating surfaces of the protruding end be constructed such that they are disposed in parallel relation to each other. This is to facilitate the mounting of a plurality of the modules (buoyant bodies) to one another so that the spaced apart terminating surfaces can function as bearing surfaces which lie flush against one another and provide for uniformity of the passages among the modules as discussed hereinafter.

A distance between the spaced apart terminating surfaces of the protruding end is also greater than a width of each of the walls adjacent thereto. The passage means of the protruding end is specifically constructed and arranged for receiving an attaching member such as a cable as will be discussed hereinafter.

Each one of the protruding members ends of the yoke thereof is connected to two adjacent walls of the front, back, top and bottom walls.

The buoyant body is also provided with another set or second transitional surfaces 44 which interconnect each one of the yokes with one of the first and second sidewalls 23, 24 in spaced relation. The second transitional surfaces are preferably of a rectangular shape, and are connected to a respective one of the transitional ends of the yoke adjacent thereto. Surfaces 44 include channels 32 which are aligned with like channels in sidewalls 22, 24. A distance between a central longitudinal line of the passage means of the yoke and an end of the protruding end is preferably less than the distance measured between the central longitudinal line of the passage means and a connection to one of the second transitional surfaces.

Each one of the first transitional surfaces 26 is connected to one of the front, back, top and bottom walls, and to two of the second transitional surfaces 44.

Preferably, the front, back, top and bottom walls, the attaching means, the first and second transitional surfaces and the first and second sidewalls all have surfaces inclined to each adjacent surface. This inclination is preferably 45° so that the surfaces provide a faceted envelope from which the attaching means or yokes protrude for connection as will be discussed hereinafter. The faceted surfaces provide for the fracturing of the flowing water as it impinges on the module, and hence, the system.

A hollow watertight chamber is formed when the front, back, top and bottom walls, the attaching means, the first and second transition surfaces and the first and second sidewalls in spaced relation are connected as shown in particular in FIG. 2.

The embodiments shown in FIGS. 1-5 and 9-13 show modules formed of a pair of mating halves 46,48 having internal walls joined together and an external circumferential dividing groove 50. Each half includes the various surfaces, walls, passages and yokes with the ribbed protrusions, ridges, grooves and channels as indicated previously.

Figure 6:
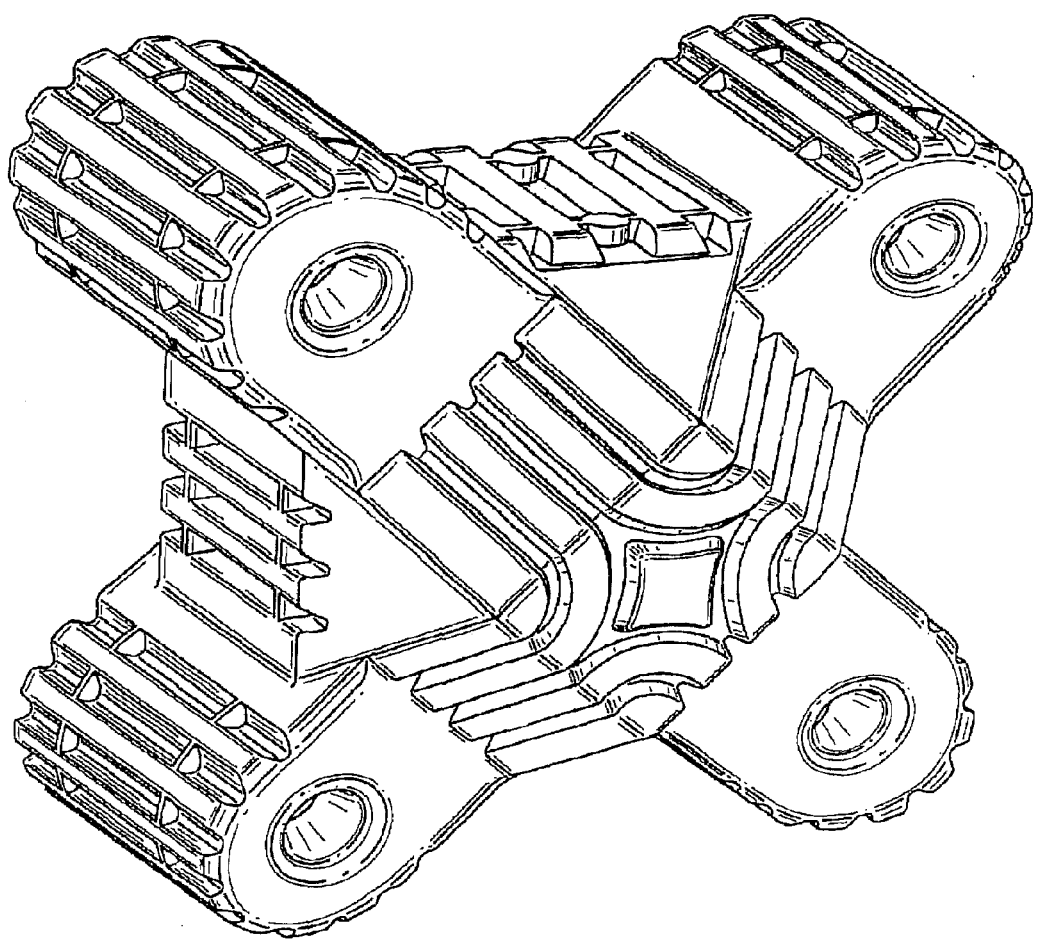
FIG. 6 is a perspective front view of a unitary ribbed module in place of the pair of modules of FIGS. 2-5.
Figure 7:
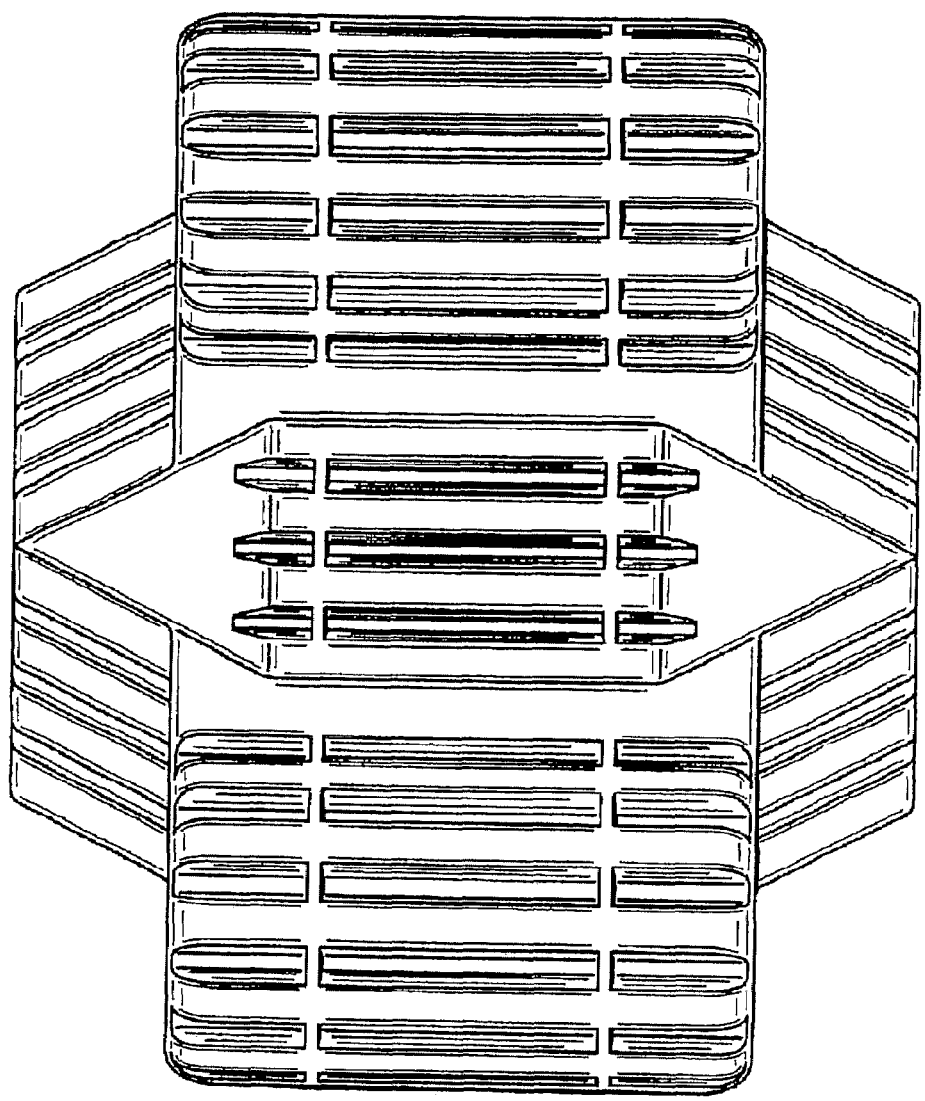
FIG. 7 is a left side elevational view of the unitary ribbed module, a right side view being a mirror image thereof.
Figure 8:
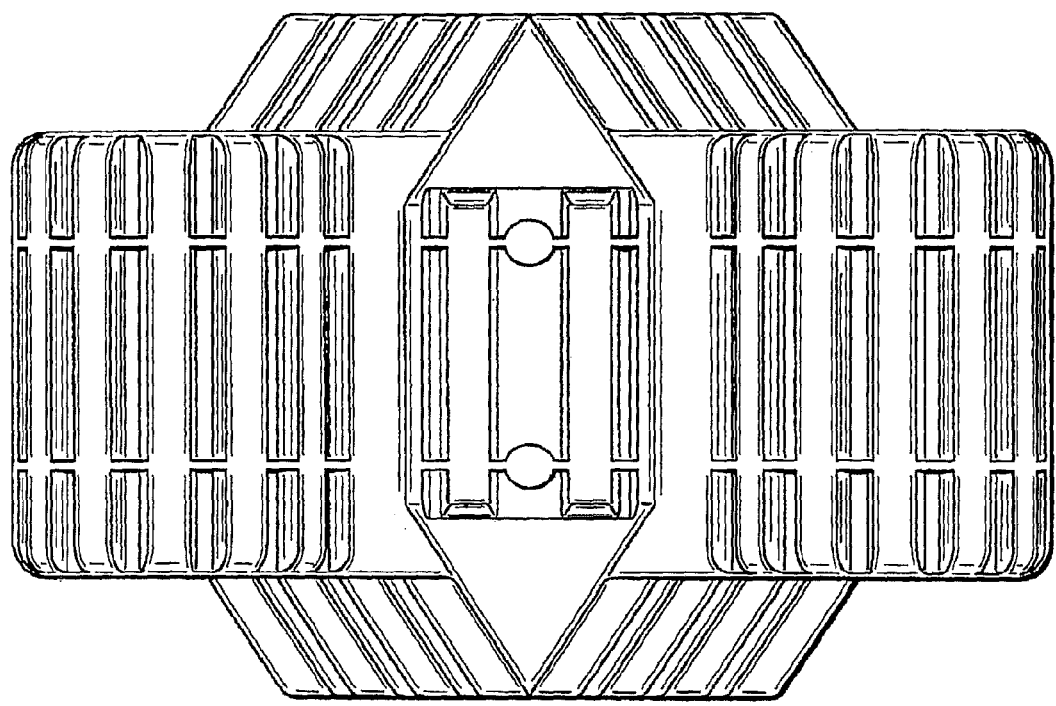
FIG. 8 is a top plan view of the unitary ribbed module, a bottom plan view being a mirror image thereof.

The embodiments of FIGS. 6-8 show modules of a unitary structure, with each individual module having the various front, rear, top, bottom, side, transition surfaces, passages and yokes incorporating the plurality of ribbed protrusions, ridges, grooves and channels as indicated above.

Figure 9:
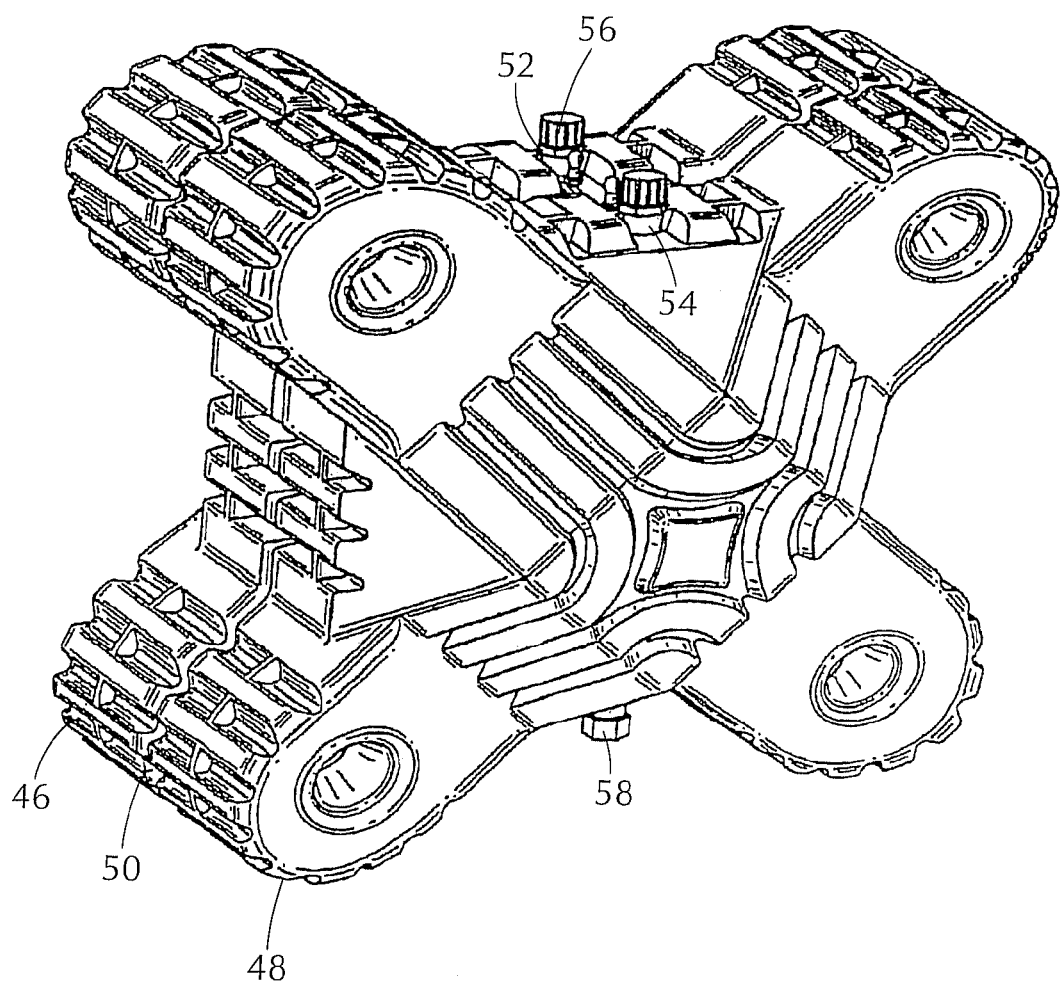
FIG. 9 is a perspective front view of another embodiment of a pair of ribbed modules.

As shown in FIG. 9, the buoyant body can have its mass and buoyancy adjusted by introducing fresh, brackish or salt water into an interior of the body, depending upon the chemistry, wave action and bottom contour in which the system is disposed. Each pair of the mating halves is formed with an aperture means such as a port 52,54 in each one of two opposed top and bottom walls. The modules are preferably arranged in the water so that the apertures are arranged in a top to bottom orientation to fill and/or drain each module as the conditions warrant. A closure means such as a removable plug 56,58 is adapted to immediately seal a corresponding one of the parts. The interior can also be filled with a marine grade floatation foam instead of water to provide added strength and make the modules unsinkable. The quantity of filling will determine the buoyancy of the modules and position in the water.

Figure 10:
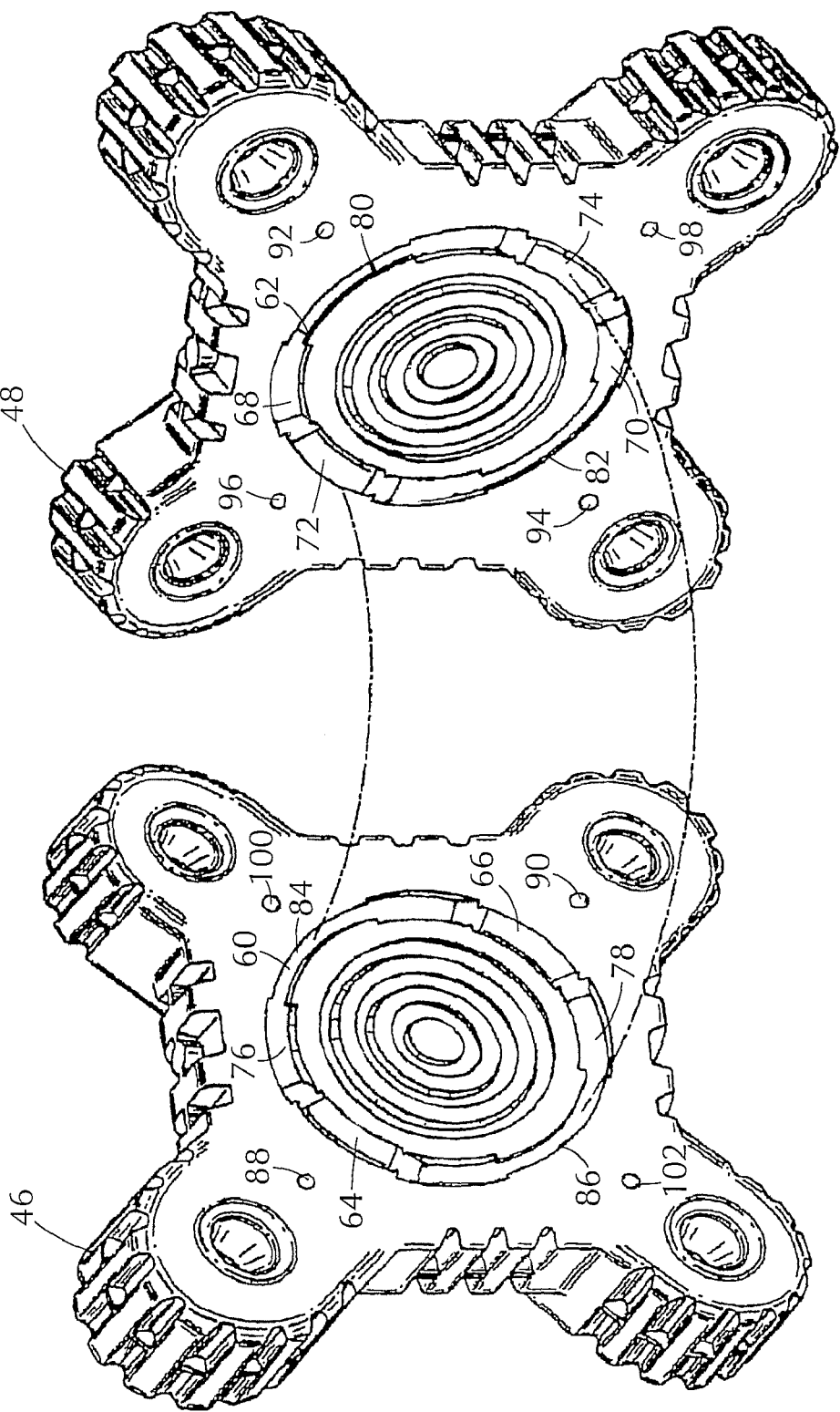
FIG. 10 is a perspective exploded view of two individual ribbed modules to be joined together as a pair.

As shown in FIG. 10, two mating module halves 46,48 incorporate locking devices to secure the halves together to form a complete assembled module. Each half includes a circular central area 60,62 having respective lugs 64,66 on module 46 mating with openings 68,70 on module 48, lugs 72,74 on module 48 mating with openings 76,78 on module 46, and slots 80,82 on module 48, and slots 84,86 on module 46, linking the various elements together when assembled. Respective nubs 88,90 on module 46 also engage sockets 92,94 on module 48, and nubs 96,98 on module 48 engage sockets 100,102 on module 46.

Figure 11:
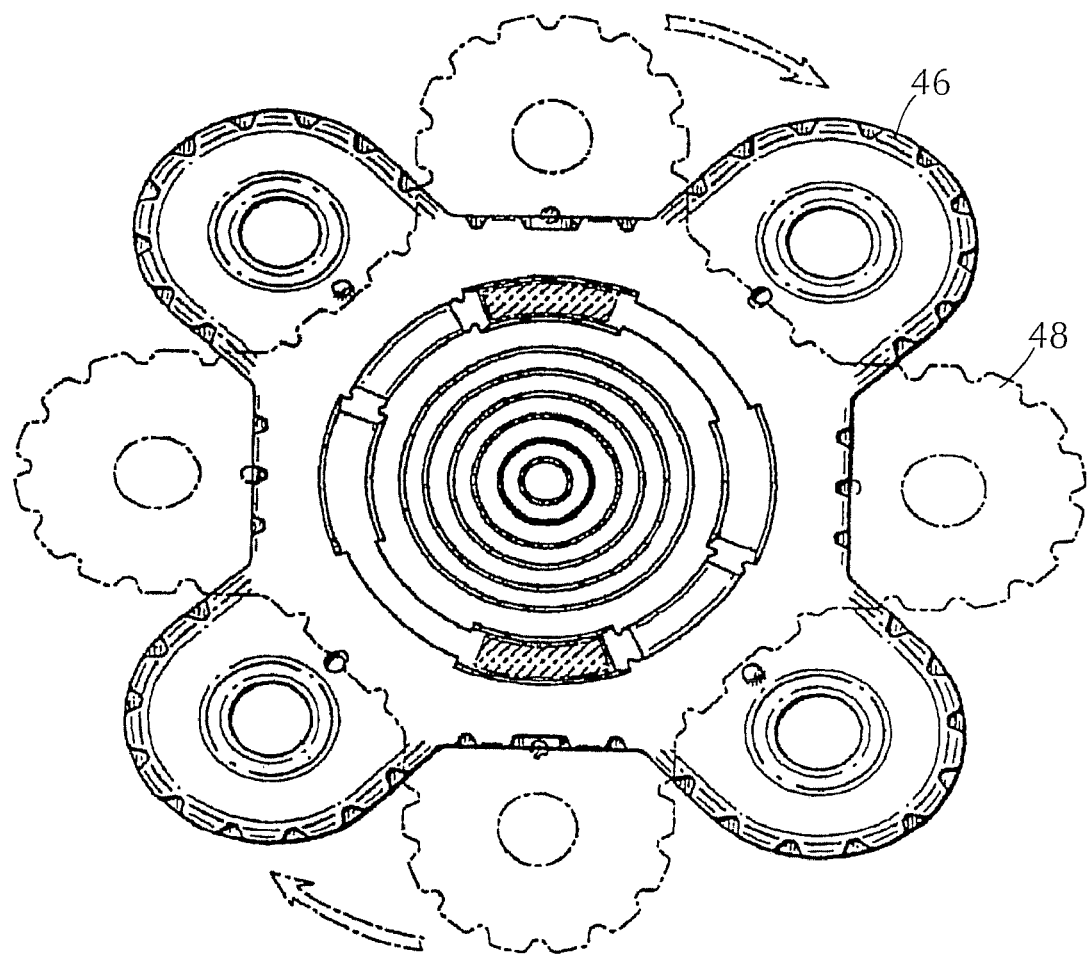
FIG. 11 is an elevational view of one of the pair of ribbed modules in position for interlocking with the second of the pair shown in dotted lines.

FIG. 11 shows how the halves are assembled by positioning module 48, shown in dashed lines, over module 46, and twisting the two together clockwise so that the respective openings and lugs and sockets and nubs are engaged.

Figure 12:
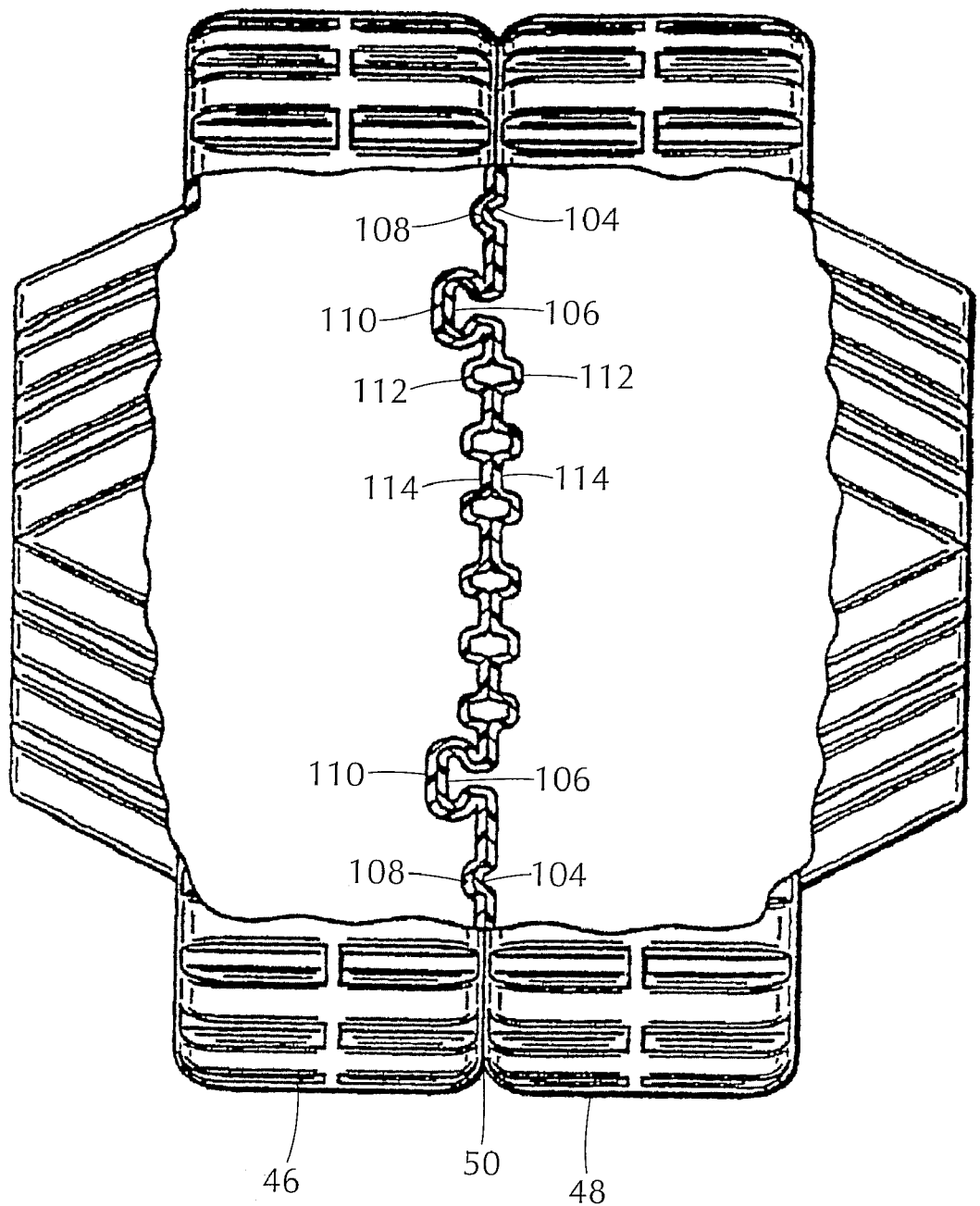
FIG. 12 is a side elevational view in partial cross section of the pair of ribbed modules showing an alternate connection assembly for joining the modules.
Figure 13:
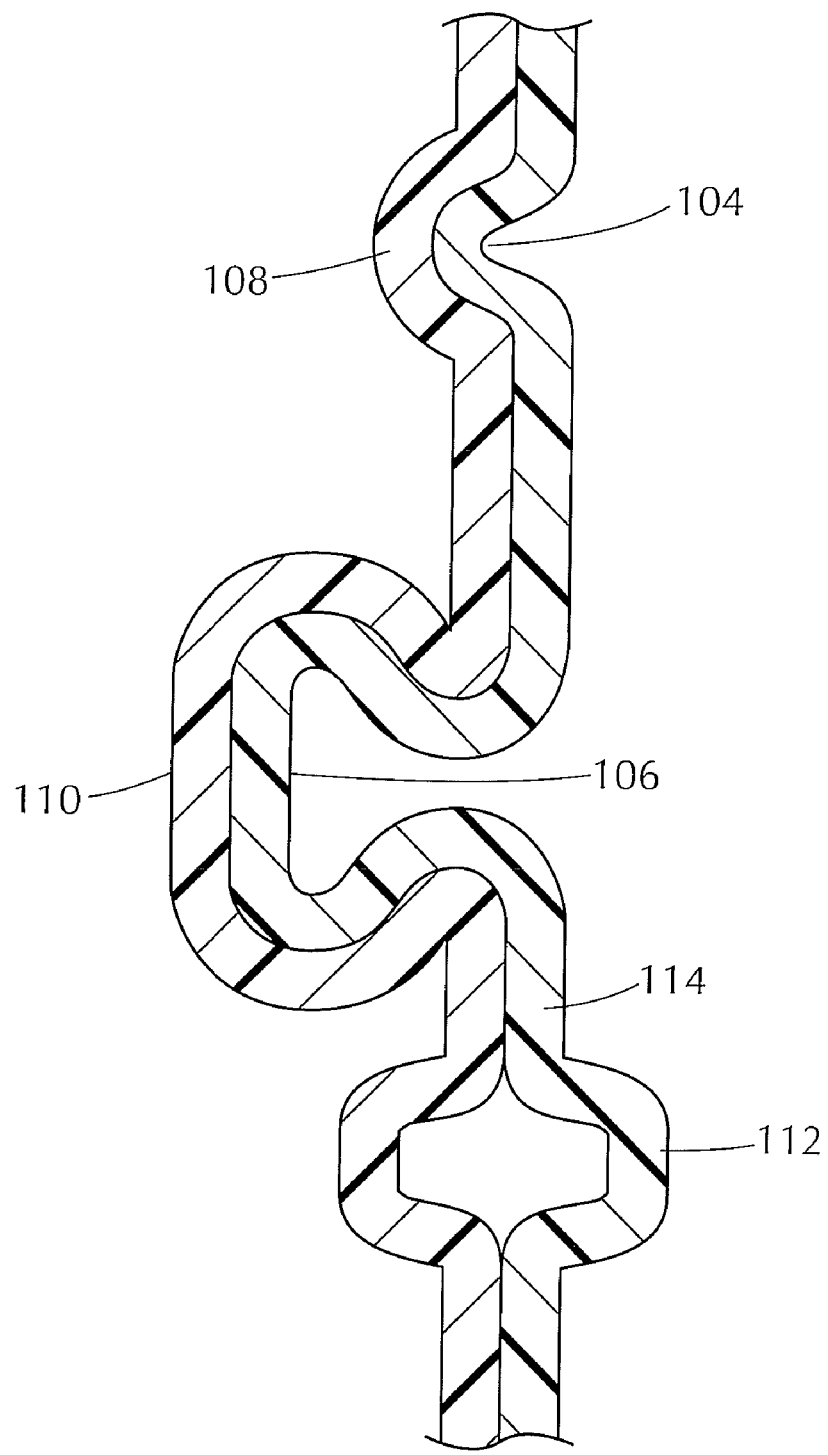
FIG. 13 is a side elevational view in partial cross section of a portion of the connection assembly.

FIG. 12 shows an alternate connection assembly for joining the two mating module halves together. In this case a convoluted internal wall section is provided on each of the module halves in place of the central area locking device of FIG. 11. The wall includes nubs 104 and lugs 106 in module half 48 which engage sockets 108 and slots 110 in the module half 46. An intermediate area includes opposing convolutions 112 and abutting portions 114. FIG. 13 shows an enlarged portion of this embodiment. The assembly is preferably formed of a suitable flexible plastic material which permits the mating sections to be engaged without difficulty.

In use, each one of the modules in the system is arranged as shown in FIG. 2 such that preferably, the angle of incidence of the wave impacting the modules contacts the wall at which point the flow of water is fractured to be guided along the convoluted transition surfaces, resulting in eddies and vortexes.

The ribbed surfaces of the modules provide increased strength, a larger surface area, more friction, more drag and more resistance to waves than previous smooth faceted structures. The assembly can be dismantled for movement to other areas and modules can be stacked for storage.

In FIG. 1, the ribbed modules of the present invention are shown arranged in layers to provide the preferred shape for use in the offshore environment. Attaching members preferably consist of marine rubber cables, such as resilient rodes used to interconnect the protruding ends of each one of the modules with, in some instances, four other separate and discrete modules. The rodes are formed of marine rubber which is extremely resilient and strong to withstand thousands of pounds of force repeatedly being exerted on the system. Stainless steel cables within a rubber layer may also be used. The cables pass through the yoke passages to connect a plurality of linked modules in a desired pattern to form barriers of various shapes and sizes to accommodate varying wave conditions. The diameters of the passages and cables may also be varied. The view of FIG. 1 provides an arrangement of avenues, streets and shafts through which the water is permitted to flow to impact and be fractured on the ribbed faceted surfaces of each successive module. FIG. 2 shows the front wall, first transitional surface and two adjacent protruding ends intended to receive the oncoming flowing water to be fractured. This perspective is shown again in FIG. 1 with a plurality of the modules of the system. An arrow indicates movement of the flowing water from offshore to onshore.

The mounting of the modules with respect to each other to form the preferred pyramidal shape results in a plurality of the avenues running along a length of the system, and a plurality of the streets extending across the width of the system and transverse to the avenues. The avenues and shafts for the passage of water are substantially rectangular in shape, while each one of the street passages is substantially octagonal in shape.

The relationship between the avenues and streets form plazas which provide for an area in which the water from the fractured wave is permitted to be deflected off the ribbed faceted surfaces of each one of the modules to impact each other to create the eddies and vortexes which interfere with the flow of the water itself, as well as any oncoming waves. In effect, the construction of each one of the modules and the system as a whole is designed to employ the energy of the flow of water against itself so that the detrimental power of the waves is substantially reduced if not eliminated.

In addition, the marine rodes have resilient properties to secure the system to the anchoring assembly such as those distributed commercially as the Manta Ray™ anchoring system. The entire system resiliently rises and falls with the movement of the waves. When the flowing water first impacts the system, in addition to any upwelling of the water which may occur due to the underlying bottom contour, the system provides for a concertina effect. That is, after the flow of water has impacted and been fractured on the ribbed faceted surfaces and protruding ends of the modules, it moves through the avenues, streets and shafts and plazas. The hydrodynamic force of the oncoming water causes the system to expand to receive the water under the concertina effect to catch or swell as much of the energy that remains in the oncoming wave. The return resiliency of the system provides its own kinetic energy as the concertina effect collapses thereby further interfering with successive waves impacting on and entering the system.

The arrangement of the modules in layers by tying a plurality of modules together with a plurality of horizontal rodes is important to the invention. Preferably, the modules are connected to each other in three dimensions to provide the most impact upon the oncoming flowing water.

The system employs at least three rows of modules, i.e. a first primary horizontal row of modules connected to another module of a second horizontal row vertically disposed from the first horizontal row which in turn is connected to still another module of a third horizontal row.

A plurality of such systems are anchored offshore of a beach to extract energy from the flowing water and waves. The arrangement of the systems can be in parallel columns, or in staggered rows. The latter is the preferable arrangement so that each one of the separate and discrete systems interferes with the wave action of one of the other systems.

The energy dissipating system of the present invention can be constructed and arranged as an assembly to react to hydrodynamic forces produced by waves. Such a system consist of a plurality of interconnectible modules and the means to resiliently connect the modules, such as the attaching members, to enable the modules to spread when subjected to hydrodynamic forces produced by waves, and concentrate when the forces are reduced. In addition, the anchoring assembly resiliently restrains displacement of the assembly urged by the buoyancy and hydrodynamic forces associated with the waves.

In particular, the modules are constructed to be assembled to thereby form vortexes between and among the modules. The spaces, i.e. the avenues, streets, shafts, and plazas, are arranged to form flow patterns for an impeded flow of the water through the assembly. Each of the modules is constructed and arranged to coact with the other modules to form an impeded flow path about and among the modules such that the eddies and vortexes discussed above are formed.

The arrangement of the modules with respect to each other provides for a pumping action between and among the modules in reaction to the buoyancy of the modules and the hydrodynamic forces to which the assembly is exposed.

The resilient restraint of the displacement of the assembly can also be controlled by adjusting the mass and buoyancy of each module, and therefore the assembly. The use of the elastomeric rodes secured to anchors in the sea floor permits each one of the assemblies to be restrained at a strategic location. The anchoring of the assembly restrains the assembly to a locus at the strategic assembly. The locus can be adjusted upon selecting an elastomeric rode having a particular length and inherent resiliency.

The present invention also provides for a method of disrupting wave action prior to the waves contacting the shore and causing erosion. The method is directed to forming an assembly or a system from a plurality of the modules, and then connecting the plurality of separate modules to be resilient in at least one dimension. Of course, arranging a plurality of layers such that the layers are interconnected to each other, such as shown in FIG. 1 is preferred. The modules are resiliently connected in a horizontal direction to enable spreading and concentration of the individual modules in response to hydrodynamic energy exerted by waves contacting the system. The assembly is positioned and anchored to a locus at a select strategic location to interfere with the oncoming waves. The buoyancy and mass of the assembly with respect to the wave action at the strategic location is also adjusted by adjusting the size and shape of the assembly and the position and number of separate modules.

Each one of the modules can be filled with air, foam, sea water, sand or marine concrete depending upon the frequency desired for the system, and will have an inertial mass of approximately 35,000 pounds. In the arrangement of the modules to form the system, the oncoming flow of water is forced to impact and be fractured upon the system as a heavily resistant filter, such as an energy filter. The anchoring cables formed of marine rubber permit the system to rise with the surge of the waves and at a certain point resist the movement, thereby further fracturing the oncoming flow of water.

Since energy is not destroyed but is converted, the movement of the system on its resilient rodes of the anchoring system converts the wave energy to heat, mechanical motion and potential energy which can be used for other applications.

A system according to the present can be made into any size, depending upon the number of modules and the layering structuring employed. For example, for a system to measure 12' wide×10' deep, approximately 51 of the modules will be required. The horizontal rodes interconnect the protruding ends of the modules. Locking caps are used to secure ends of the rodes at the spaced apart terminating surfaces, which function as bearing surfaces discussed above. The system is naturally buoyant and without fill will have a lifting capacity of in excess of 15,000 pounds in water.

A plurality of the systems are preferably placed in horizontal rows parallel to and in appropriate depth from the shore to create a flexible energy filter through which waves must pass to reach the shore. Under certain conditions, horizontal rows will be paralleled by a second or third horizontal row which will act as a layer defense in those environments where the wave activity is more vigorous or the shore is exposed to storms.

An uppermost layer of the system can be painted in an international color such as orange, to denote certain areas. The system is constructed such that only approximately one layer of modules will extend from the water's surface, depending upon the salinity of the water. In addition, the anchoring assembly is such that system can be uncoupled from its mooring and removed to a remote location where it can be used, repaired or replaced.

The modules may incorporate various colored or luminescent surfaces for identifying their location. They may also be employed as supporting structures for mounting platforms, signs and detection devices, or used as floating docks.

It will be understood that the embodiments described herein are merely exemplary and that a person skilled in the art may make many variations and modifications without departing from the spirit and scope of the invention. All such modifications and variations of the invention are intended to be covered in the appended claims.

What is claimed is:

1. A buoyant body, comprising:
an exterior envelope defining a hollow watertight chamber
said envelope comprising a plurality of intersecting planar and cylindrical surfaces forming walls having ribbed outer surfaces,
a plurality of said planar and cylindrical surfaces having a plurality of at least one of protrusions, ridges, grooves and channels formed on said planar surfaces and said cylindrical surfaces,
said plurality of intersecting planar and cylindrical surfaces sized and shaped to receive flowing water and direct the water in a direction different from the direction in which the water is received,
means enabling attachment to other buoyant bodies,
said envelope including a first part and a second part, the first and second parts being symmetrical and arranged for engagement to each other to provide a complete body, wherein said first and second parts include complementary opposing internal wall surfaces having engageable mating extensions and grooves for securing parts together to form a single body.

2. A buoyant body, comprising:

an exterior envelope defining a hollow watertight chamber;

said envelope comprising a plurality of intersecting planar surfaces and cylindrical surfaces, a plurality of said intersecting planar surfaces and cylindrical surfaces having a plurality of at least one of protrusions, ridges, grooves and channels formed on said planar surfaces and said cylindrical surfaces, said planar surfaces and cylindrical surfaces sized and shaped to receive flowing water and direct the water in a direction different from the direction in which the water is received, and means enabling attachment to other buoyant bodies, said buoyant body including a front wall, a back wall, a top wall, a bottom wall, first and second side walls in a spaced relation, a plurality of interesecting surfaces between said walls, a plurality of spaced extending yokes connected to a plurality of said walls, said yokes including passage means for enabling attachment to other buoyant bodies, the outer surfaces of said walls and yokes having ribbed areas shaped to receive flowing water and direct flowing water in a direction different from the direction in which the water is received, wherein said side walls extend outwardly beyond the widths of the other said walls providing a thicker central dimension, and said buoyant body further comprising internal surfaces formed of a flexible material having opposing convolutions including engageable mating protrusions and slots securing said parts together.

* * * * *